United States Patent [19]

Kawasaki

[11] Patent Number: 5,696,743
[45] Date of Patent: Dec. 9, 1997

[54] INFORMATION ACCESS APPARATUS FOR OPTICAL DISC HAVING A PLURALITY OF RECODING LAYERS

[75] Inventor: Satoshi Kawasaki, Tokyo, Japan

[73] Assignee: NEC Corporation, Tokyo, Japan

[21] Appl. No.: 720,569

[22] Filed: Oct. 1, 1996

[30] Foreign Application Priority Data

Oct. 30, 1995 [JP] Japan ................................. 7-281822

[51] Int. Cl.$^6$ ................................................. G11B 17/22
[52] U.S. Cl. ................................................. 369/32; 369/94
[58] Field of Search ........................... 369/32, 94, 44.28, 369/49.27, 44.29, 44.26, 44.34, 44.35, 275.1

[56] References Cited

U.S. PATENT DOCUMENTS

| | | | |
|---|---|---|---|
| 4,450,553 | 5/1984 | Holster et al. | 369/94 |
| 5,251,198 | 10/1993 | Strickler | 369/94 |
| 5,373,499 | 12/1994 | Imaino et al. | 369/94 |
| 5,485,452 | 1/1996 | Maeda | 369/284 |
| 5,499,231 | 3/1996 | Fennema et al. | 369/94 |
| 5,526,338 | 6/1996 | Hasman et al. | 369/94 |
| 5,540,966 | 7/1996 | Hintz | 369/275.1 |
| 5,555,537 | 9/1996 | Imaino et al. | 369/94 |
| 5,586,107 | 12/1996 | Best et al. | 369/275.1 |
| 5,598,389 | 1/1997 | Best et al. | 369/275.1 |

OTHER PUBLICATIONS

K. Koumura et al., "High Speed Accessing by Direct Accessing", *Japanese Journal of Applied Physics*, vol. 28, Aug. 1989, Supplement 28-3, pp. 73-76.

*Primary Examiner*—Tan Dinh
*Attorney, Agent, or Firm*—Young & Thompson

[57] ABSTRACT

An information access apparatus for an optical disc according to the present invention has an optical head transporting device for initiating movement of the laser focusing point to a different plane on an optical disc, and an optical head seek controlling device for radially transporting an optical head to a target track radially of the optical disc while counting tracks on a plane of a predetermined layer of the optical disc. A plane selecting device is provided for selecting the plane having an optimum SN ratio of a tracking signal a maximum amplitude tracking signal, or a maximum amplitude readout signal obtained from each recording layer of the optical disc when retrieving information on the optical disc, and a focus jump controlling device is provided for controlling movement from a plane on which focusing is currently performed to another plane selected by the plane selecting device when an information access command is issued from a host device.

12 Claims, 5 Drawing Sheets

INFORMATION ACCESS APPARATUS FOR OPTICAL DISC HAVING A PLURALITY OF RECODING LAYERS

BACKGROUND OF THE INVENTION

1. Field of the Invention

The present invention relates to an information access apparatus for an optical disc, and more particularly to an information access apparatus for an optical disc which is mounted within an optical disc playback apparatus for reading information on an optical disc, e.g., digital video disc, having two or more recording layers.

2. Description of the Related Art

In order that a prior art optical disc playback apparatus have access to information, there has been adopted a technique whereby an optical head is rapidly and roughly moved (coarse seek operation) by a linear motor, a feed screw mechanism or any other means for driving the optical head in a radial direction of a disc, and a spot of a beam for reading information is then precisely positioned (precise seek operation) by a track jump carried out by an actuator for an objective lens disposed on the optical head.

As the track which the optical head has reached after the first coarse seek approaches the target track, the time taken for the precise seek can be reduced, thereby shortening the time for accessing the information. Further, since it is generally desirable to shorten the time taken for the coarse seek itself, the positional control for precisely moving the optical head in the radial direction of the disc at high speed is important in order to improve the information access speed.

In this case, when an optical disc apparatus receives a command for accessing information from a host device, the optical disc apparatus first determines the relation between a logical number and a physical position of the information on the disc to calculate a number of tracks over which the optical head moves.

In case of a CD-ROM which records information according to a CLV (constant linear velocity) system for example, if it is assumed that the track number is N, the recording start radius is $r_1$, the track pitch is p, the information recording linear velocity is lv and the logical information number (accumulating total of frames) is t, the relation can be expressed by the following formula (1):

$$N = -\pi r_1/\pi p + [(\pi r_1)^2 + \pi p l v t]^{1/2}/\pi p \qquad (1)$$

where the linear velocity is specified as a number between 1.2 to 1.4 [m/s] in accordance with, for example, the compact disc standard (CD standard).

As a technique for precisely performing the coarse seek at high speed when accessing information, there is a direct track count (DTC) method using a number of tracks calculated as described above, which is described in, for example, K. KOUMURA, "High Speed Accessing by Direct Accessing", *Proc. Int. on Optical Memory*, 1989, *Japanese Journal of Applied Physics*, Vol. 28 (1989) Supplement 28-3, pp. 73–76.

This method will be described with reference to the accompanying drawings. According to the DTC (direct track count) method, track count signals are counted; a speed is controlled by the number of remaining tracks before reaching the target track; and tracking is immediately turned ON on the target track to complete the coarse seek. The speed control is carried out by generating a desired speed profile such as shown in FIG. 3 in accordance with a number of remaining tracks before reaching the target track and feeding back the difference between that desired speed and the actual speed.

The desired speed profile often has a trapezoidal shape, as shown in FIG. 3(a). Rise of the maximum head speed gives rise to a distortion of the track count signals, and the over-high speed causes the objective lens to widely oscillate or the beam spot to pass a part of the disc where no pit is formed, thereby degrading the track error signal and disabling the accurate counting operation. A trapezoidal shape is thus imposed on the desired speed profile in order to prevent this defect.

When no count error is expected, a triangular profile (the maximum acceleration is performed, and the maximum deceleration is then carried out at an intermediate point) such as shown in FIG. 3(b) may be used.

As the need for storing a mass of data such as digital moving pictures on personal computers has been increasing in recent years, the capacity of storage devices must be enlarged.

When an optical disc is used as a medium of storage for digital video, it is superior to a magnetic tape medium in a recording density and access speed, but is inferior to magnetic tape in storage capacity, and thus is inferior to magnetic tape in the amount of digital video it is capable of storing.

In the field of optical laser discs, there has been adopted a double-sided disc produced by laminating two one-sided discs back to back to increase storage capacity or playback time. This double-sided disc is not a desirable solution when using a single optical head for reading information, because the disc must be taken out and flipped over to be again inserted into the optical disc playback device after playback of the information on one side is completed.

Therefore, as a method for increasing the recording capacity when reading information on only one side of the disc, U.S. Pat. No. 4,450,553 discloses a method by which multiple recording layers of the disc are employed. Further, the digital video disc (DVD) which has been proposed as an optical disc device for the next generation adopts a system by which two recording layers are used to double the playback time.

FIG. 4 shows a cross-sectional structure of a dual-layer disc (multilayer disc). Information is recorded on a substrate material such as plastic by a method such as injection molding, and a spacer layer material having a higher refractive index than that of the substrate is provided on the substrate so that information of the second layer is recorded by the photo-polymer method (G. BOUWHUIS et al., "Principles of Optical Disk Systems", Adam Hilger Ltd., Bristol and Boston, p. 204–206) method or the like. A reflective layer having a high reflectance, e.g., aluminum is further formed thereon by the sputtering method or the like. A laser beam for reading information is incident through the above-mentioned substrate to be focused on a first recording layer or a second recording layer.

The information is recorded as a series of pits of variable length on these recording layers. When the pits are exposed to the laser beam, an amount of the reflected light is decreased by scattering or diffraction of the light. Then, the reflected light is received by a photodetector to be converted into electric signals.

The light reflected from the multilayer disc can be weakened, in principle, as compared to that from the single-recording-layer disc. For example, in case of a two-layer disc, when a refractive index of each layer has such a value as shown in FIG. 4, a reflectance of each of the first and second layers can be represented by the following expressions, respectively:

$$R_1 = I_1/I_0 = (n_1-n_0)/(n_1+n_0) \quad (2)$$

$$R_2 = I_2/(I_0-I_1) = (n_2-n_1)/(n_2+n_1) \quad (3)$$

In case of the single-recording-layer disc, the reflectance R can be expressed as follows:

$$R = (n_2-n_0)/(n_2+n_0) \quad (4)$$

Assuming that the laser beam for reading information is red and polycarbonate is used as the substrate material, the refractive index $n_0$ becomes 1.58. When material having a relatively-high refractive index, e.g., SiOx, is used for the spacer layer and aluminum is used for the reflective layer, $n_1=3.0$ and $n_2=(1.73+j7.96)$ can be obtained. $R_1=0.31$ and $R_2=0.87$, whereas $R=0.92$.

Regarding the amount of reflected light, if $I_0=1$, $I_1=0.31$ and $I_2=0.60$ can be established. Therefore, an amount of light reflected from the multilayer disc can be decreased from ⅓ to ⅔ of that from the single-layer disc (although the further description will not be given hereinbelow, the $I_2$ will be further decreased to be 40% of the above value because multiple reflections must be actually taken into consideration).

The SN ratio of the tracking signals obtained from the light reflected from a multilayer disc is thus deteriorated as compared to that of the tracking signals obtained from light reflected from a single-layer disc, and the possibility that the track count signals obtained by binary-coding the tracking error signals are erroneously counted can be disadvantageously increased.

Furthermore, since an access control system for the optical disc obtains a number of tracks over which the optical head moves during the information access by counting the track count signals, access must be again performed when the erroneous counting has repeatedly occurred, thus disadvantageously increasing the access time.

In order to eliminate the above-described drawbacks in the prior art, it is an object of the present invention to provide an information access apparatus for an optical disc, by which the number of track counting errors can be reduced when accessing information recorded on the multilayer disc, to thereby realize a high speed access to the information recorded on the disc.

SUMMARY OF THE INVENTION

To this end, the invention comprises: an optical head transporting means for supporting and transporting an optical head opposite to an optical disc having two or more recording layers and for initiating movement of a focusing point to a plane of the optical disc; and an optical head seek controlling means for transporting the optical head in an optical disc radial direction until the optical head reaches a target track in accordance with a predetermined head seek algorithm while counting tacks on the plane of a predetermined layer of the optical disc.

There is also provided a plane selecting means for selecting a plane having an optimum SN ratio of a tracking signal, a maximum amplitude tracking signal, or a maximum amplitude readout signal, obtained from each recording layer of the optical disc when retrieving information on the optical disc.

The present invention also comprises a focus lump controlling means for controlling movement from a plane on which focusing is performed to another plane selected by the plane selecting means on the optical disc when an information access command is issued from a host device.

According to the invention, when a host device (for example, a personal computer or the like) issues an access command to the optical disc device, a control microcomputer 5C of the plane selecting means 5 is first activated to read and judge a number of a track (positional information) on which the optical head 2 currently exists from information on the optical disc 1.

A track number at which information to be accessed that is directed by the host device is stored is then calculated, and a direction and a number of tracks on which the optical head 2 moves are thereby also determined. If the optical disc 1 whose information is currently reproduced is a multilayer disc, the control microcomputer 5B can be informed of a plane on which the optical head currently exists because plane numbers are recorded on the optical disc 1 and calculates a direction in which movement from a plane to another plane is made and a number of planes over which the jump is performed.

Moreover, the optical head seek controlling means 4 controls a movement speed and a position of the optical head 2 based on the information output from the optical head 2 in accordance with a seek algorithm such as the DTC (direct track count) system. The optical head seek control or the focus jump control according to the DTC system is managed by the above-mentioned control microcomputer 5C.

On the other hand, when reproducing information on the multilayer disc, movement to the different plane is carried out, as well as movement across the tracks. In such a case, in order to reduce track count errors as much as possible, the plane selecting means 5 selects a plane having the optimum SN ratio of the tracking signal, and the focus jump controlling means 6 makes the focus jump to the selected plane before the movement across the tracks and again effects the focus jump to a target plane after the track change is carried out on the selected plane. This greatly reduces track count errors.

The present invention alternatively adopts a structure in which the plane selecting means comprises a tracking signal amplitude measuring means for measuring an amplitude of the tracking signal obtained from each recording layer on the optical disc and a main controller for recording in a memory a number of the recording layer having a largest amplitude of the amplitude signal output from the tracking signal amplitude measuring means, the main controller being operated in response to an information access command fed from the host device and having a plane movement control function for forcibly effecting movement from the plane on which focusing is carried out to another plane having a number recorded in the memory when the information access command is issued.

With this arrangement, a function similar to that described above can be obtained, and track movement is performed on the plane having the optimum SN ratio of the amplitude of the tracking signal obtained from each recording layer on the optical disc by the operation of the tracking signal amplitude measuring means, thereby effectively reducing the track count errors.

In this case, the control microcomputer 5B as the main controller measures an amplitude value of each plane when loading information on the optical disc 1 and stores the thus-obtained result of measurement in the memory 5C. The control microcomputer 5B then compares these amplitude values to obtain the number of the plane having the maximum amplitude value and stores that number in a predetermined area of the memory 5C. Thus, the maximum amplitude of the tracking signal and the plane number are always stored in the memory 5C.

The present invention alternatively adopts a structure in which the above-mentioned plane selecting means comprises a reproduction (readout) signal amplitude measuring means for measuring an amplitude of a reproduction (readout) signal obtained from each recording layer on the optical disc and a main controller for recording in a memory a number of the recording layer having a largest amplitude of the amplitude signals output from the reproduction (readout) signal amplitude measuring means, the main controller being operated in response to an information access command from the host device and having a plane movement control function for forcing movement from a plane on which focusing is carried out to another plane having a number recorded in the memory when the information access command is issued.

In the present invention, since a plane having a maximum value of the reproduction (readout) signal amplitude (plane having an optimum SN ratio) in place of the tracking signal amplitude is captured and movement from one track to another track is effected on the plane, the function similar to that described above can be obtained, thus effectively reducing the track count errors.

The invention alternatively provides a main controller for measuring a plane of the recording layer that outputs a maximum amplitude among the tracking signal amplitudes or the reproduction signal amplitudes obtained from the respective recording layers on the optical disc and for storing a number of the measured plane in a memory, the main controller being activated in response to an information access command from the host device and having a plane movement control function for forcing movement from a plane on which focusing is effected to another plane whose number is recorded in the memory when the information access command is issued.

With such an arrangement, the function similar described above can be obtained, and provision of the tracking signal amplitude measuring means (or the reproduction signal amplitude measuring means) described above becomes unnecessary, thus simplifying the structure.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIGS. 3(a,b) are explanatory views used for explaining tracks of the moving speed of an optical head, wherein

DETAILED DESCRIPTION OF THE PREFERRED EMBODIMENTS

A first embodiment according to the present invention will now be described with reference to FIG. 1.

Figure 1:
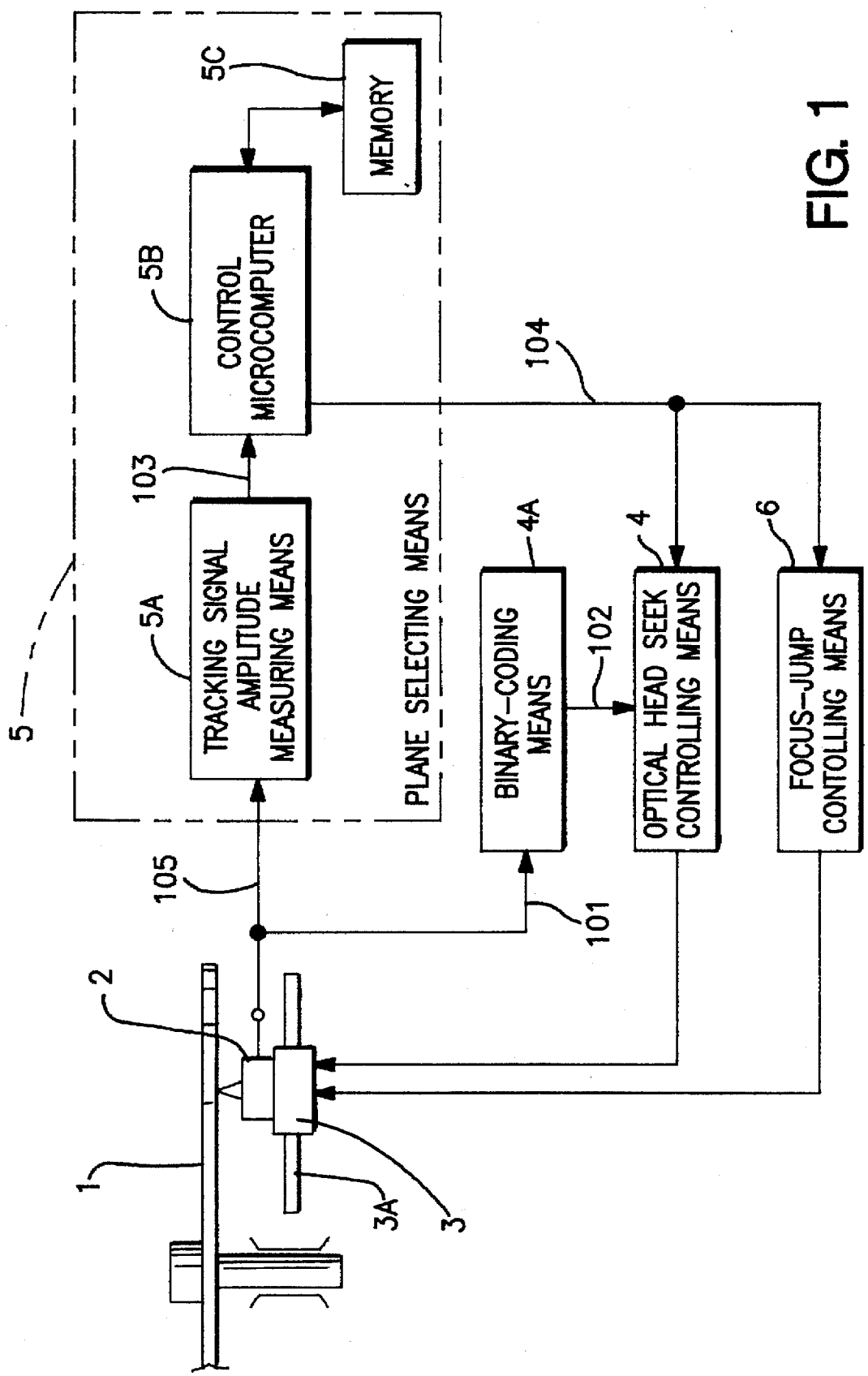
FIG. 1 is a block diagram showing a first embodiment according to the present invention.

In FIG. 1, reference numeral 1 denotes an optical disc having two or more recording layers. An optical head 2 and an optical head transporting means 3 supporting and transporting the optical head 2 and initiating the movement of the focusing point to a different plane on the optical disc 1 are mounted so as to be opposed to the optical disc 1. Reference character 3A represents a guide for the optical head transporting means 3.

In the first embodiment, there is also provided an optical head seek controlling means 4 that controls the radial movement of the optical head 2 to a target track of the optical disc 1 in accordance with a predetermined head seek algorithm while counting tracks on a plane of a predetermined layer of the optical disc 1.

The optical head seek controlling means 4 receives a tracking signal 101 output from the optical head 2 through a binary-coding means 4A as a binary-coded track count signal 102, and controls a moving speed and a position of the optical head 2 based on the received signal in accordance with a seek algorithm such as the DTC system.

Moreover, in the first embodiment, there are also provided a plane selecting means 5 for selecting a plane on which the SN ratio of a tracking signal obtained from each recording layer of the optical disc 1 is optimum when retrieving information on the optical disc 1, and a focus jump controlling means 6 for controlling movement from a plane on which focusing is effected to another plane selected by the plane selecting means 5 on the optical disc 1 when an information access command is issued from a host device.

Here, the plane selecting means 5 includes a tracking signal amplitude measuring means 5A for measuring an amplitude of the tracking signal obtained from each recording layer on the optical disc 1 and a control microcomputer 5B as a main controller for recording in a memory 5C a number of a recording layer having the largest amplitude tracking signal output from the tracking signal amplitude measuring means 5A.

The control microcomputer 5B is operated in response to an information access command from a host device, and has a plane movement control function for forcing movement from a plane on which focusing is being effected to another plane whose number is recorded in the memory 5C.

The operation of the embodiment illustrated in FIG. 1 will now be explained.

When accessing the information on the optical disc 1, the focussing servo is turned on to focus the laser on optical disc 1, or, if the focussing servo is already on, the optical head 2 is radially transported to an appropriate position by a transporting means 3 such as a linear motor or a feed gear system, and a tracking servo control is thereafter carried out to read positional information stored in the optical disc 1. The time information of music can be discretely recorded instead of the positional information as a sub-code in the main information in a compact disc (CD) or the like, and in such a case, the information is similarly converted into a track number using the expression (1) described in the prior art section.

When an access command is issued from a host device (for example, a personal computer or the like) to an optical disc device, the control microcomputer 5B of the plane selecting means 5 is first activated, and reads and determines a number of the track (positional information) over which the optical head 2 is currently located from the information on the optical disc 1 as described above.

Following a request for information from the host device, the number of the track at which the information to be accessed is stored, is calculated using the expression (1) or the like. As a result, a direction and a number of tracks in and over which the optical head 2 moves are determined. Further, when the optical disc 1 in question is a multilayer disc, since its plane numbers are also recorded on the optical disc 1, the control microcomputer 5B can recognize the plane on which the optical head is currently focussed and can calculate a direction for moving the optical head 2 to a different plane and a number of planes on which the optical head 2 jumps, from the information concerning the desired plane number communicated by the host device.

A tracking signal 101 is output from the optical head 2 to be binary-coded by a binary-coding means 4A as a track count signal 102 to be input to an optical head seek control means 4. The optical head seek control means 4 controls a moving speed and position of the optical head 2 in accordance with a seek algorithm such as the DTC (direct track count) system described in the prior art section. The optical head seek control or the focus jump control according to the DTC system or the like are managed by a control signal 104 fed from the above-mentioned control microcomputer 5C.

Meanwhile, when reading information from a multilayer disc, movement across planes must be carried out as well as movement across tracks. In this case, selection of a plane on which track movement is carried out becomes a primary concern. In this embodiment (FIG. 1), in order to reduce track count errors as much as possible, the plane selecting means 5 selects a plane on which the SN ratio of the tracking signal 101 is optimum, and the focus jump control means 6 performs focus jump to the selected plane before any track movement is carried out and thereafter carries out track movement to again perform focus jump to a target plane.

In the first embodiment illustrated in FIG. 1, a read signal 105 is input to the tracking signal amplitude measuring means 5A, and an amplitude value signal 103 output therefrom is read by the control microcomputer 5B to be stored in the memory 5C. The control microcomputer 5B measures the amplitude value 103 of each plane when the optical disc 1 is loaded on the optical disc device, and stores the result of this measurement in the memory 5C. The control microcomputer 5B then compares these stored amplitude values and calculates the plane number of the plane having the maximum amplitude value, and stores this value in a predetermined area of the memory 5C.

Figure 5:
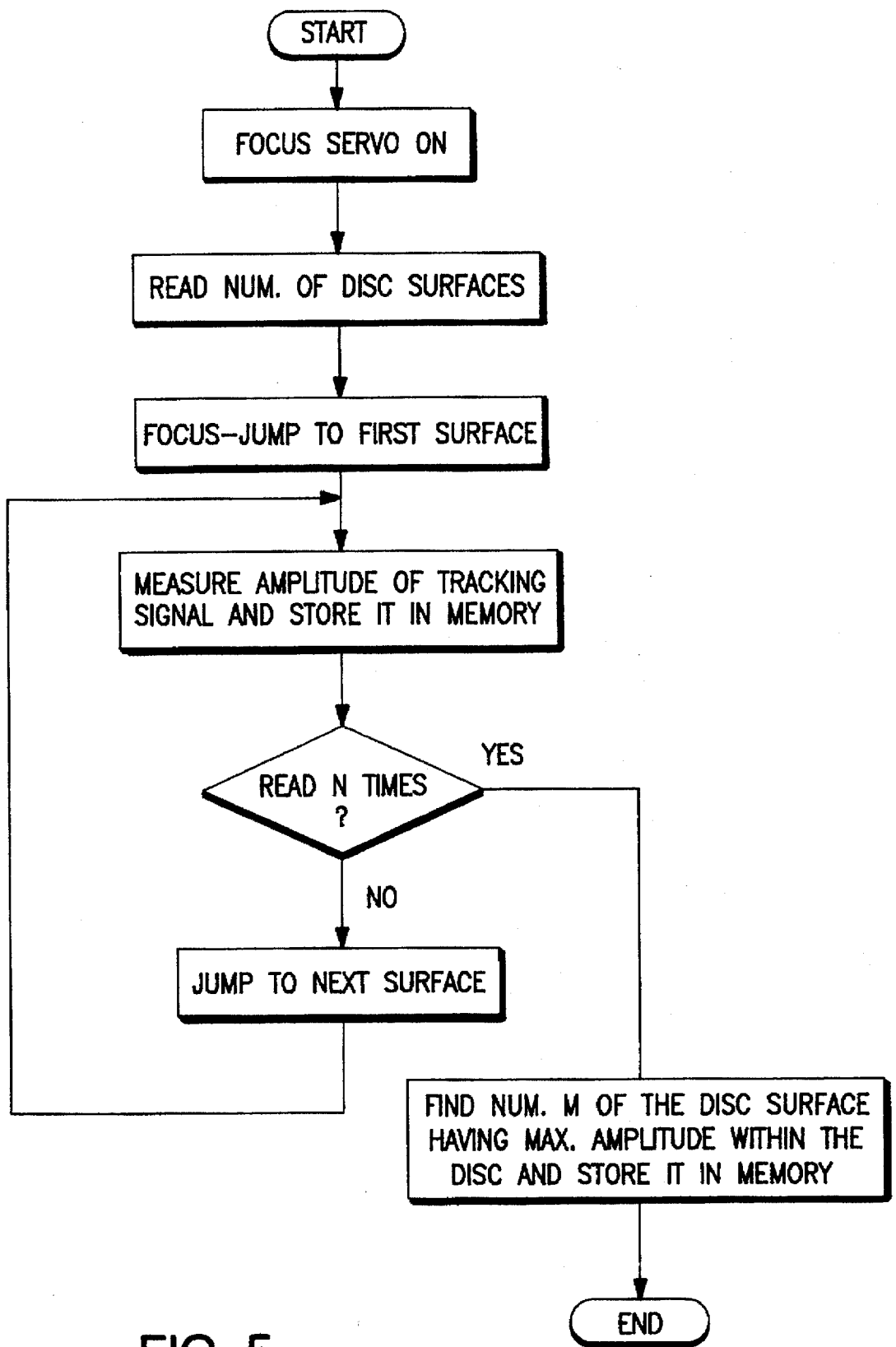
FIG. 5 is a flow chart showing the functioning of the access apparatus during loading of a multilayer disc.

FIG. 5 shows the process of establishing and storing the number of the plane having the optimum SN ratio during the loading of a multilayer disc. After a disc is loaded in the access apparatus, the control microcomputer 5B causes the optical head transporting means 3 to focus on one of the disc surfaces and to read the number of disc surface. Then it causes the optical head transporting means 3 to focus-jump to the first surface. After that, it measures the amplitude of the tracking signal from the first surface to the Nth surface and stores these data in the memory 5C. After finishing measurement of the Nth surface, the microcomputer determines the number M of the disc surface having the maximum amplitude within the disc and stores it in the memory 5C.

Figure 6:
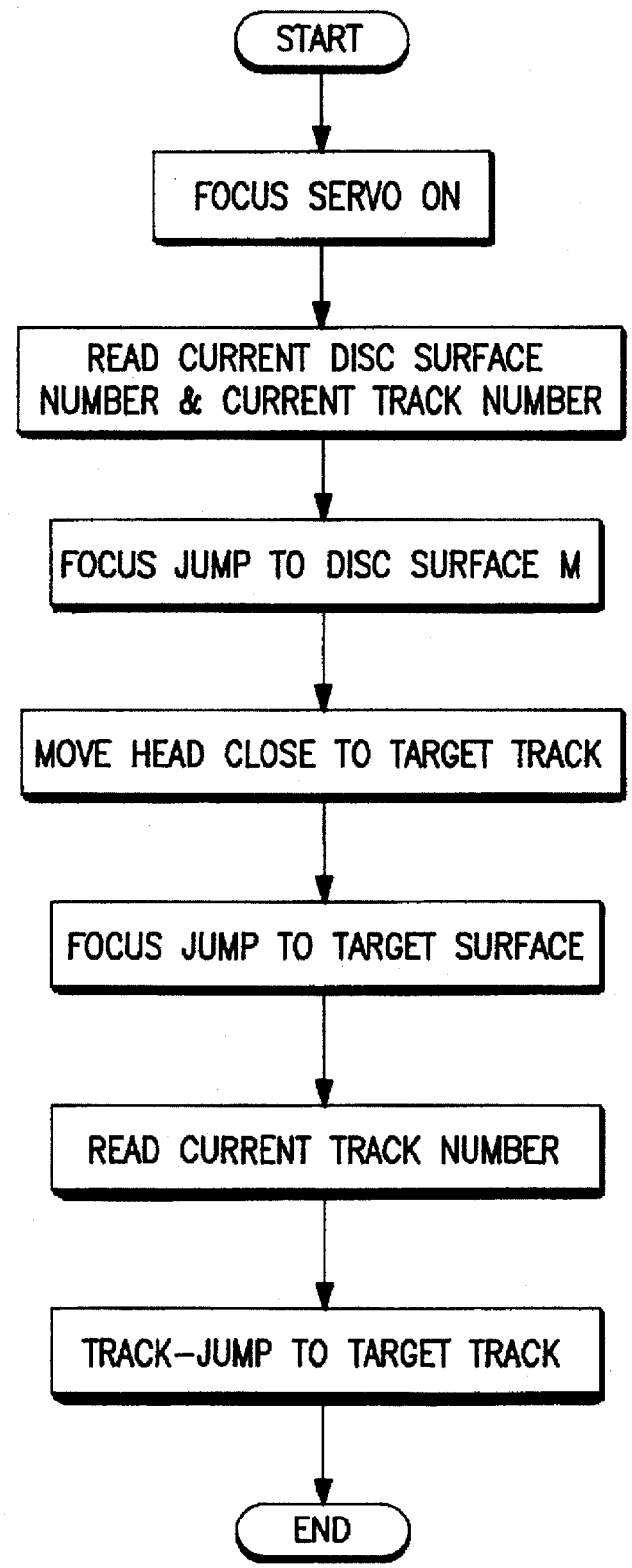
FIG. 6 is a flow chart showing an access process for multilayer disc.

FIG. 6 shows the process for accessing a desired track on a given plane within a multilayer disc. First, the control microcomputer 5B reads the current disc surface number and the current track number. Then, it causes the optical head transporting means 3 to focus-jump to the surface M, which has been determined to have the maximum amplitude, and it causes the head to move close to a target track by means of the DTC method. After that, it causes the optical head transporting means 3 to focus-jump to a target surface. Finally, the control computer 5B reads the current track number and causes the optical head transporting means 3 to track-jump by a number equal to the difference between the current track number and the target track number, to reach the target track.

Returning now to FIG. 1, the plane selecting means 5 is constituted by the tracking signal amplitude measuring means 5A, the control microcomputer 5B and the memory 5C. In the first embodiment, the plane having the largest amplitude tracking signal from which the track count signal 102 is generated, is designated as the plane having the optimum SN ratio.

A second embodiment will now be described with reference to FIG. 2.

Figure 2:
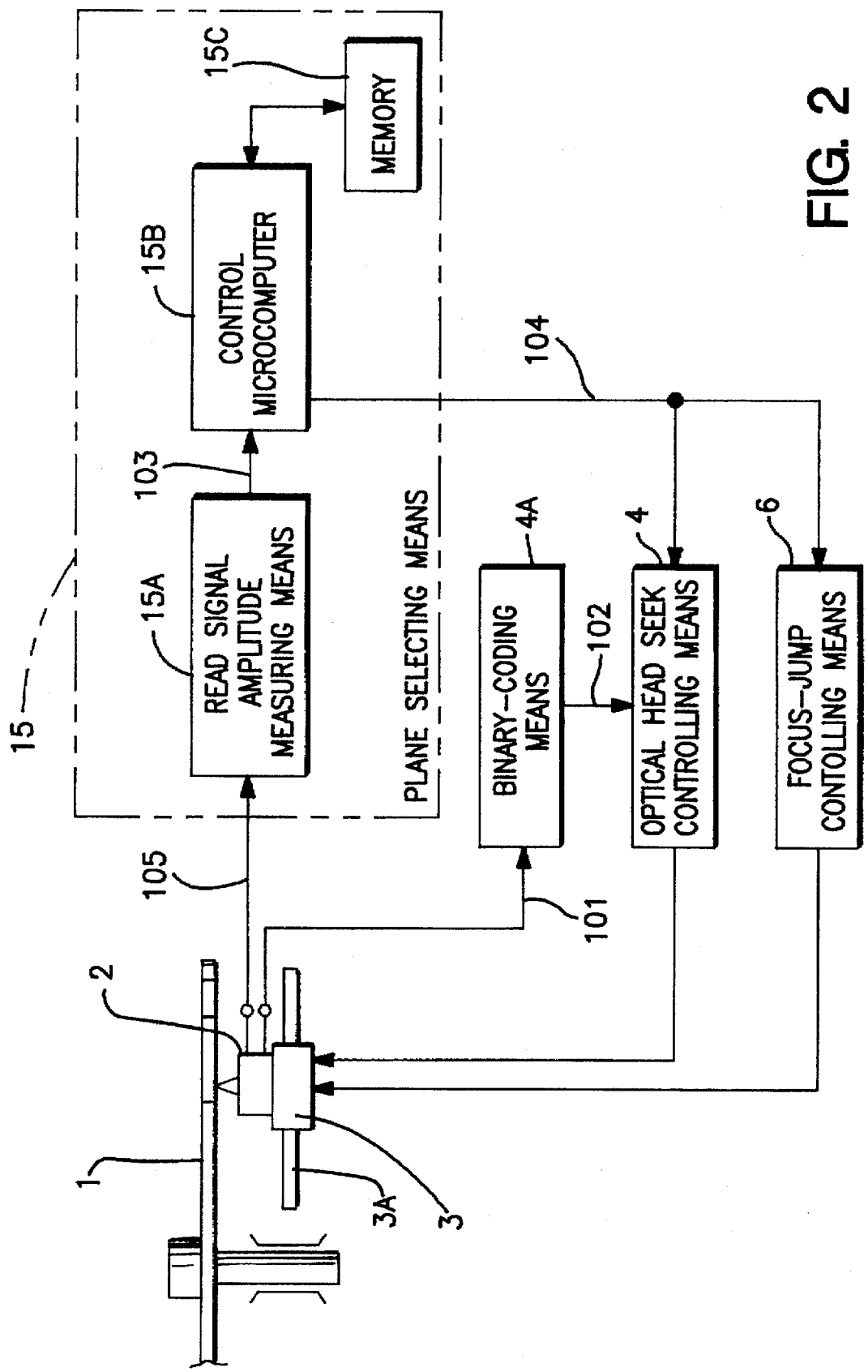
FIG. 2 is a block diagram showing a second embodiment according to the present invention.
Figure 3A:
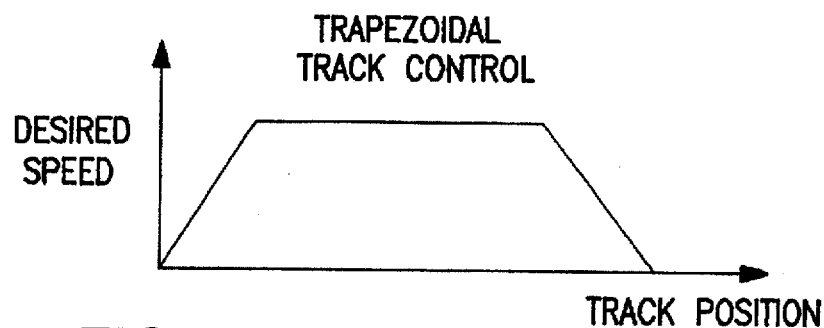
FIG. 3(a) is a graph showing the trapezoidal track and FIG. 3(b) is a graph showing a triangular track.
Figure 3B:
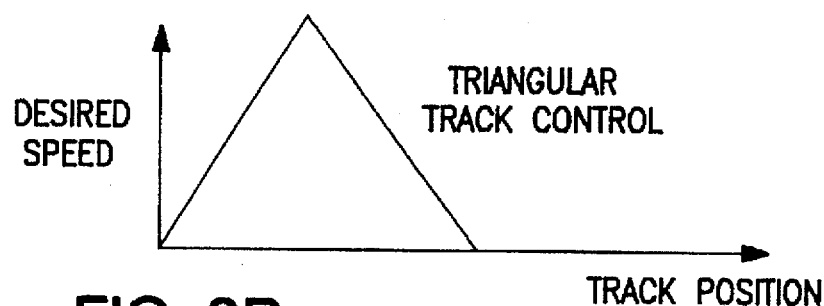
Figure 4:
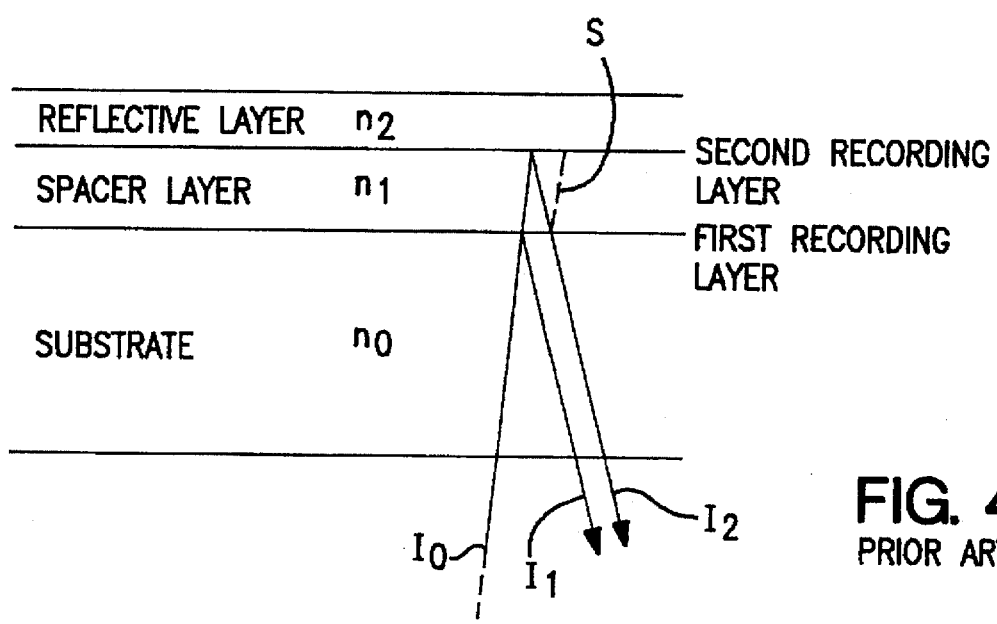
FIG. 4 is an explanatory view showing a cross-sectional structure of a two-layer disc and a reflection path of a laser beam.

In the second embodiment, a plane having the largest amplitude read signal 105 is the plane designated as having the optimum SN ratio, and the configuration of the second embodiment is illustrated in FIG. 2.

Although the plane having a largest amplitude of the tracking signal 101 generally equals the plane having a largest amplitude of the read signal 105, they may not be actually equal to each other, due to the optical head. Thus, either a method by which count errors can be reduced or another method by which the circuit structure can be simplified may be selected according to the specific application.

In FIG. 2, in contrast with the embodiment shown in FIG. 1, the plane selecting means 15 is constituted by a read signal amplitude measuring means 15A, a control microcomputer 15B and a memory 15C because the attention is focused on an amplitude of the read signal. The read signal 105 is therefore input from the optical head 2 to the read signal amplitude measuring means 15A. The other elements and the operation thereof are the same as with the embodiment illustrated in FIG. 1.

The third embodiment will now be described.

Although the amplitude of the tracking signal and the amplitude of the read signal are large as a condition of the plane on which track count errors can be reduced in the above respective embodiments, it is not true of other examples. For example, in case of the two-layer disc, the signal amplitude of the second layer is larger than that of the first layer, but count errors can be greatly reduced with signals of the first layer due to the influence of multiple reflection of the light.

When judgment cannot be made using a condition of, e.g., the signal amplitude because of a structural design of the optical disc 1 or a design value of an optical system of the optical head 2 (namely, when a plane appropriate for track counting can not be determined using information of, e.g., the signal amplitude which can be measured), an optimum track counting plane may be previously selected in accordance with design values of the disc structure or a result of an experiment and recorded in the memories 5C and 15C of the control microcomputers 5B and 15B, thereafter performing track counting on the selected plane.

In this case, the above tracking signal amplitude measuring means 5A or reproduction (readout) signal amplitude measuring means 15A becomes unnecessary.

Since the present invention is configured to function in this way, track count errors which are critical for the seek control of the optical head can be reduced when retrieving information from a multi-layer optical disc. Control for accurately transporting the optical head is therefore enabled by the head seek algorithm, such as a direct track count access system, and it is possible to provide an excellent novel information access apparatus for optical discs which can achieve high-speed information access.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. An information access apparatus for an optical disc, comprising:

an optical head transporting means for supporting and transporting an optical head, said transporting means being disposed opposite to an optical disc having at least two recording layers, each of said recording layers having a recording plane, and for driving a movement of a focussing point to one of said recording planes within said optical disc;

an optical head seek controller means for controlling a radial movement of the optical head to a target track of said optical disc while counting tracks on each of said recording planes of said optical disc;

a plane selecting means for selecting a recording plane having a desired characteristic from each of said recording planes of the optical disc when retrieving information from the optical disc; and a focus jump controlling means for controlling movement from a recording plane on which focussing is currently performed to said selected recording plane when an information access command is issued from a host device.

2. An information access apparatus for an optical disc as set forth in claim 1, wherein said desired characteristic is a largest amplitude of a tracking signal.

3. An information access apparatus for an optical disc as set forth in claim 2, wherein said plane selecting means comprises:

a tracking signal amplitude measuring means for measuring an amplitude of said tracking signal for each of said recording planes within said optical disc; and a main controller means for determining and recording, in a memory, a number of said recording plane having said largest amplitude of said tracking signal output from said tracking signal amplitude measuring means, wherein said main controller means is operated in response to said information access command issued from the host device and comprises a plane movement control means for forcing movement from said recording plane under which focussing is currently performed to said selected recording plane having said number recorded in said memory, when the information access command is issued.

4. An information access apparatus for an optical device as set forth in claim 1, wherein said desired characteristic is a largest amplitude of a readout signal.

5. An information access apparatus for an optical disc as set forth in claim 4, wherein said plane selecting means comprises:

a readout signal amplitude measuring means for measuring an amplitude of said readout signal from each of said at least two recording planes within said optical disc; and a main controller means for determining and recording, in a memory, a number of said recording plane having said largest amplitude of said readout signal output from said readout signal amplitude measuring means, wherein said main controller means is operated in response to said information access command issued from said host device and comprises a plane movement controlling means for forcing movement from said recording plane on which focussing is currently performed to said selected recording plane having said number recorded in said memory, when the information access command is issued.

6. An information access apparatus for an optical device as set forth in claim 1, wherein said desired characteristic is an optimum SN ratio of a tracking signal.

7. An information access apparatus for an optical device as set forth in claim 1, further comprising a main controller for determining which of said recording planes outputs one of a maximum amplitude tracking signal and a maximum amplitude readout signal, and for storing, in a memory, a number of said determined recording plane, said main controller being operated in response to an information access command from said host device, and having a plane movement controlling means for forcing movement from a recording plane under which focussing is currently performed to said selected recording plane having said number recorded in said memory, when the information access command is issued.

8. A method of detecting which recording plane of an optical disc exhibits a tracking signal of maximum amplitude, said optical disc having at least two recording layers, each of said recording layers having a recording plane, and storing, in a memory, a number of said detected plane, said method comprising the steps of:

reading a number N of recording planes of said optical disc;

focus-jumping to a first of said N recording planes;

measuring an amplitude of said tracking signal, and storing said amplitude in said memory;

determining a number of said recording plane having said maximum amplitude tracking signal within said optical disc, and storing it in said memory, if said measuring step has been carried out N times; and focus-jumping to a next surface and repeating said measuring step, if said measuring step has not been carried out N times.

9. A method of detecting a recording plane of an optical disc that exhibits a maximum amplitude readout signal, said optical disc having at least two recording layers, each of said recording layers having a recording plane, and storing, in a memory, a number of said detected plane, said method comprising the steps of:

reading a number N of recording planes within said optical disc;

focus-jumping to a first recording plane;

measuring an amplitude of a readout signal and storing said amplitude in said memory;

determining said recording plane of said disc having said maximum amplitude readout signal, and storing said number in said memory, if said measuring step has been carried out N times; and focus-jumping to a next recording plane and repeating said measuring step, if said measuring step has not been carried out N times.

10. A method of detecting a recording plane of an optical disc that exhibits an optimum SN ratio of a tracking signal, said optical disc having at least two recording layers, each of said recording layers having a recording plane, and storing a number of said detected recording plane in a memory, said method comprising the steps of:

reading a number N of recording planes within said optical disc;

focus-jumping to a first recording plane;

measuring a SN ratio of said tracking signal, and storing said SN ratio in said memory;

determining a number of a recording plane having an optimum tracking signal SN ratio within said optical disc, and storing said number of said recording plane in said memory, if said measuring step has been carried out N times; and focus-jumping to a next surface and repeating said measuring step, if said measuring step has not been carried out N times.

11. A method of accessing a target track on a predetermined recording plane of an optical disc, said optical disc comprising at least two recording layers, each of said recording layers having a recording plane, said method comprising the steps of:

reading a number of a current recording plane and a first current track number on said current recording plane;

focus jumping to a selected recording plane which outputs a desired characteristic among all recording planes of said optical disc;

moving an optical head close to a target track;

focus-jumping to said selected, recording plane;

reading a second current track number; and track-jumping to said target track.

12. A method according to claim 11, wherein said desired characteristic is selected from the group consisting of a maximum amplitude tracking signal, a maximum amplitude readout signal, and an optimum SN ratio tracking signal.

* * * * *